May 15, 1928.

O. T. BUGG 1,669,854

RUBBER ARTICLE

Filed Nov. 11, 1926

WITNESSES
William P. Goebel
Franklin J. Foster

INVENTOR
Owen T. Bugg.
BY
Munn & Co.
ATTORNEY

Patented May 15, 1928.

1,669,854

UNITED STATES PATENT OFFICE.

OWEN THOMAS BUGG, OF BEACON, NEW YORK, ASSIGNOR TO JAMES HAROLD WARNER, OF POUGHKEEPSIE, NEW YORK.

RUBBER ARTICLE.

Application filed November 11, 1926. Serial No. 147,788.

The present invention in its broader aspects is concerned with the provision of a hollow integral rubber article and a method of producing it. It is to be understood that the word "hollow" is to be interpreted in its broadest sense, and is intended to cover any rubber article having a cavity in its interior, whether the cavity be large or small. The word "rubber" which will be used throughout the specification and claims is also used in its broadest sense to cover any type of rubber composition or generally similar material capable of vulcanization.

It has been proposed to use ammonia concealed within the crude rubber which gasifies and expands during the vulcanizing operation and produces a cavity at the interior of the article. This process is obviously unsatisfactory since there is no means for regulating the size of the cavity which is formed, or the shape of it. The ammonia gas, following the lines of least resistance when expanding produces an irregular cavity, the walls of which are rough and uneven.

In a preferred embodiment of the invention, I produce a hollow integral article of rubber, in which the cavity is defined by a mandril which forms a permanent part of the article. The mandril however, is of fragile crushable material, readily crushed and rendered inoperative by stresses and strains on the completed article. There is thus retained all of the resiliency and distortability of the article, while at the same time there is produced an integral hollow rubber article molded on a mandril.

Other objects of the invention are to provide an article and method well suited to the requirements of economical and expeditious manufacture.

With the above noted and other objects in view, the invention consists in certain novel features of construction and combinations and arrangements of parts, as will be more fully hereinafter set forth and pointed out in the claims. The invention may be more fully understood from the following description in connection with the accompanying drawings, wherein—

Figure 1:
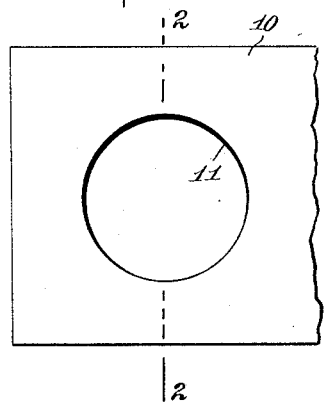
Fig. 1 is a fragmentary view in side elevation of a rugged block having an opening extending from side to side thereof as the preliminary step of the method.
Figure 2:
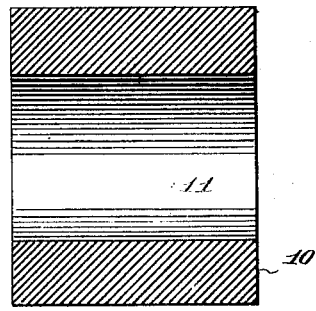
Fig. 2 is a transverse sectional view through Fig. 1 on the line 2—2.

In Fig. 1 I have used the reference character 10 to designate a block of crude rubber having an opening 11 extending transversely therethrough. It is to be understood that the block 10 may be of any desired length and have any suitable number of other or similar openings therein. After producing the openings 11 in the block, the next step of the method is to insert a hollow mandril 12 in the opening. This mandril has been illustrated as a tubular member sealed at its ends by caps 13. The mandril completely fills the opening 11 being of the same cross sectional shape as the opening and extending from end to end of the latter. This mandril is of some material which will be sufficiently rigid to stand up during the vulcanizing operation, and yet sufficiently fragile so that it will be readily crushed when subsequent distorting strains are transmitted to the completed rubber article. One material suitable for use in the mandril is ordinary cardboard. The caps 13 might be formed of heavy paper if desired, it being understood that I do not wish to limit myself to the particular material mentioned, but to cover any material suitable for the purpose.

After the mandril is in place, a sheet or block of rubber 14 is laid against each end of the mandril, and the article is placed in a vulcanizing mold and vulcanized in any conventional or convenient manner by the application of heat and pressure.

Figure 3:
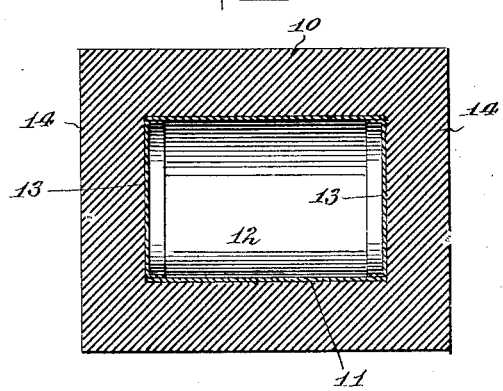
Fig. 3 is a view similar to Fig. 2, but showing the mandril in place and two blocks or sheets of rubber vulcanized over the ends of the opening so that the mandril is embedded in an integral body of rubber.
Figure 4:
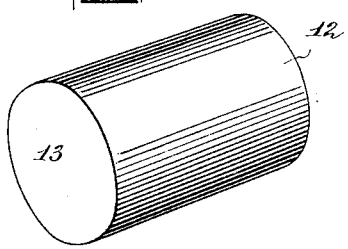
Fig. 4 is a perspective view of the mandril.

The completed article illustrated in Fig. 3, will be a hollow integral rubber body having its interior cavity lined by the mandril. When the article is subjected to crushing or other distorting strains, the material of the mandril will be immediately crushed, and the mandril will be entirely inoperative to prevent distortion of the body in any direction. The presence of the crushed and inoperative mandril within the hollow body will in no way affect the utility of the rubber article thus produced, which might for instance be a buffer or a bumper of any desired nature.

As suggested above, the use of the term "cardboard" in the specification and claims is intended to cover paper and other equivalent material.

Various changes and alterations might be made in the general form and arrangement of parts described without departing from the invention. Hence I do not wish to limit myself to the details set forth, but shall consider myself at liberty to make such changes and alterations as fairly fall within the spirit and scope of the appended claims.

I claim:

1. As a new article of manufacture, a rubber body having a closed hollow mandril completely embedded therein, the mandril being of cardboard.

2. As a new article of manufacture, a rubber body having a hollow mandril completely embedded therein, the mandril comprising a sealed air-filled cardboard container.

OWEN THOMAS BUGG.